F. V. COOKE.
NUT LOCKING MEANS.
APPLICATION FILED NOV. 19, 1920.
1,398,681.
Patented Nov. 29, 1921.
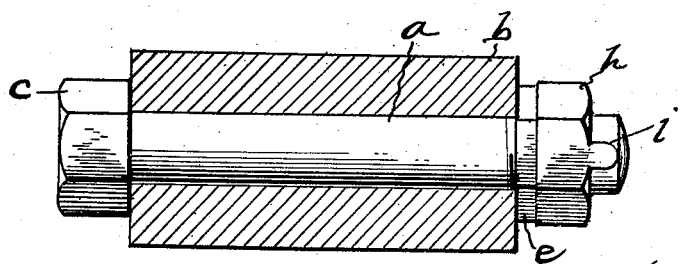
Fig. 1
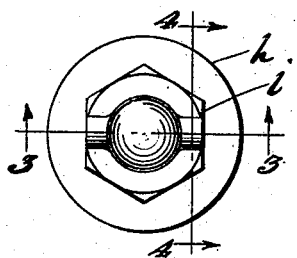
Fig. 2
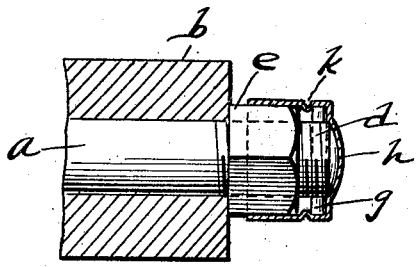
Fig. 3
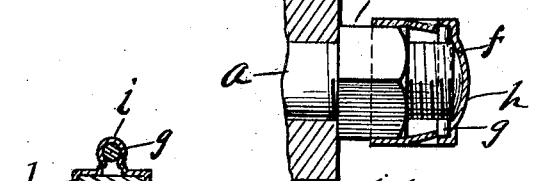
Fig. 6
Fig. 4
Fig. 5
Frank V. Cooke INVENTOR.
BY
Ralzemond A. Parker ATTORNEY.

UNITED STATES PATENT OFFICE.

FRANK V. COOKE, OF HIGHLAND PARK, MICHIGAN.

NUT-LOCKING-MEANS.

1,398,681.   Specification of Letters Patent.   Patented Nov. 29, 1921.

Application filed November 19, 1920. Serial No. 425,109.

*To all whom it may concern:*

Be it known that I, FRANK V. COOKE, a citizen of the United States, residing at Highland Park, county of Wayne, State of Michigan, have invented a certain new and useful Improvement in Nut-Locking Means, and declare the following to be a full, clear, and exact description of the same, such as will enable others skilled in the art to which it pertains to make and use the same, reference being had to the accompanying drawings, which form a part of this specification.

My invention relates to nut locking means. The object is to provide a simple inexpensive means for locking a nut to a threaded member adapted to securely hold the nut against rotation and adapted to be easily secured in position as hereinafter described and claimed.

In the drawings:

Figure 1 is an elevation of my locking means secured to a nut and bolt;

Fig. 2 is an end view of Fig. 1;

Fig. 3 is a section taken on line 3—3 of Fig. 2;

Fig. 4 is a cross section taken on line 4—4 of Fig. 2;

Fig. 5 is a fragmentary section showing a modified form of locking pin;

Fig. 6 is a fragmentary section showing a slight modification in the lock washer.

Let $a$ indicate a threaded member in the form of a bolt, $b$ the fixture through which the bolt is passed, $c$ the bolt head, and $d$ the threaded end of the bolt. $e$ is a nut adapted to be received on said threaded portion of the bolt. The threaded portion of the bolt near its outer end is perforated as at $f$, to provide a transverse passage for a securing pin $g$.

My locking means comprises a cap or cup shaped washer $h$. The open or enlarged end of the washer is shaped to conform with the shape of the nut over which it is to be received, so that the washer will embrace the nut and prevent the rotation thereof. That portion of the washer which is adapted to fit over the threaded end of the bolt is naturally shaped to conform to the shape of the bolt as shown in Fig. 1, except that on opposite sides it is provided with slotted passage-ways or grooves $i$ adapted to receive the ends of the pin $g$.

In the assembly of this device after the nut has been threaded on the bolt and the pin $g$ inserted in the provided passage $f$, opposite ends of the pin project beyond the side of the bolt. The washer is then passed over the end of the bolt and engaged over the nut so as to prevent the rotation of the nut therein, opposite ends of the pin $g$ being received within the grooves of the washer. Rotation of the washer and nut upon the bolt is therefore prevented. The wall of the washer is then crimped inwardly between the pin $g$ and the nut, as shown at $k$, thereby securing the washer in place. The washer shell may be crimped inwardly by means of a pair of pincers or in manner as may be desired. When the shell is once bent in, the washer will be held firmly in place through the engagement of the crimped in portion with the pin $g$. This is clearly shown in Figs. 3, 4, 5, and 6. Fig. 3 illustrates the form of construction just described.

Fig. 5 illustrates a somewhat different form of pin, in that the ends of the pin are beveled so that the washer may be more easily removed. $a^2$ the washer is pulled outwardly to remove the same. The shell of the washer springs over the ends of the pin.

Fig. 6 is a somewhat different form of construction in that the shell of the washer is cut as shown and tongue-like portions of the shell punched inwardly to be engaged by the pin.

The purpose and assembly of the device is apparent from the above description and drawings.

What I claim is:

1. In combination with a nut and the end of a threaded member, said threaded end being provided with a transverse aperture therethrough, a pin adapted to be received in said aperture, a washer adapted to be received upon the end of said threaded member provided with a portion adapted to embrace the nut so as to prevent rotation thereof and provided with grooves within which the opposite ends of the pin are adapted to be received, said washer adapted to be crimped inwardly between the nut and the pin.

2. In a lock washer, in combination with a bolt and nut, said bolt provided with a transverse opening through the threaded portion thereof, a pin adapted to be received in said opening projecting on both sides of the bolt, said washer adapted to be received over the bolt and the nut, and provided with a nut embracing portion adapted to embrace the nut so as to prevent rotation of the nut, and provided with oppositely disposed recesses adapted to receive the ends of the pin, so as to prevent rotation of the washer on the bolt, said washer adapted to be crimped inwardly between the nut and the pin.

3. In a lock washer, in combination with a threaded bolt and nut, said bolt provided at the threaded end with a transverse passageway therethrough, a pin provided with beveled ends adapted to be received through said passageway and adapted to project on each side of the bolt, a cup shaped washer adapted to be received over the bolt and nut and so shaped as to embrace the nut preventing the rotation of the nut within the washer, and provided with longitudinally extending slotted ways, adapted to receive the projecting ends of the pin so as to prevent rotation of the washer on the bolt, said washer adapted to be crimped inwardly between the pin and the nut.

4. In a lock washer, in combination with a threaded bolt and nut, said bolt provided with a transverse aperture through its threaded portion, a pin adapted to be received through said aperture and to project on opposite sides of the bolt, a cup shaped washer adapted to be received over the end of the bolt and provided with a nut engaging portion adapted to embrace the nut so as to prevent rotation of the nut within the washer, said washer provided with a slotted pin-way on opposite sides adapted to receive the projecting ends of the pin, the shell of said washer provided with punched out tongue-like projections adapted to be forced inwardly between the pin and the nut to prevent the removal of the washer.

In testimony whereof, I sign this specification.

FRANK V. COOKE.